(12) United States Patent
Yen

(10) Patent No.: US 8,650,988 B2
(45) Date of Patent: Feb. 18, 2014

(54) HAND TOOL HAVING MULTIPLE SWITCHABLE FUNCTIONS

(76) Inventor: Chao-Chin Yen, Taipei (TW)

( * ) Notice: Subject to any disclaimer, the term of this patent is extended or adjusted under 35 U.S.C. 154(b) by 319 days.

(21) Appl. No.: 13/198,839

(22) Filed: Aug. 5, 2011

(65) Prior Publication Data

US 2013/0031728 A1    Feb. 7, 2013

(51) Int. Cl.
*H02G 1/12* (2006.01)
*B25F 1/00* (2006.01)

(52) U.S. Cl.
USPC .................................. 81/9.41; 7/108; 81/438

(58) Field of Classification Search
USPC .............. 81/9.41–9.44, 438; 7/107, 108, 158; 30/90.1, 91.2
See application file for complete search history.

(56) References Cited

U.S. PATENT DOCUMENTS

| | | | | |
|---|---|---|---|---|
| 1,413,101 A * | 4/1922 | Cushing | ........................... | 81/438 |
| 1,440,014 A * | 12/1922 | Kallio | ............................... | 7/118 |
| 6,351,865 B1 * | 3/2002 | De Donato | ....................... | 7/107 |
| 7,621,040 B2 * | 11/2009 | Sullivan | ........................... | 7/107 |
| 8,109,002 B2 * | 2/2012 | Frazer | ............................. | 30/123 |
| 8,220,135 B2 * | 7/2012 | Vogel et al. | ....................... | 7/108 |

* cited by examiner

*Primary Examiner* — Hadi Shakeri
(74) *Attorney, Agent, or Firm* — Chun-Ming Shih; HDLS IPR Services

(57) ABSTRACT

A hand tool includes a casing, a press cutting mechanism, a switching wheel and stripping mechanism. The casing has a hollow chamber in its interior. The press cutting mechanism is installed inside the hollow chamber. The press cutting mechanism includes a ram component and a sleeve that sheathes the ram component. The external periphery of the sleeve has a first positioning surface. The switching wheel has a through hole that corresponds to and selectively connects to the sleeve. The inner wall of the through hole has a second positioning surface. The stripping mechanism has a lock connected to the casing through a soft belt. By turning the switching wheel, the second positioning surface and the first positioning surface can be aligned or misaligned. As a result the hand tool can be switched between two or more functions.

9 Claims, 10 Drawing Sheets

HAND TOOL HAVING MULTIPLE SWITCHABLE FUNCTIONS

BACKGROUND

1. Technical Field

The present invention generally relates to a hand tool, and more particularly, to a hand tool having multiple switchable functions.

2. Related Art

Conventionally, a hand tool for peeling the insulation layer of a sheathing wire and cutting the sheathing wire is like a long pair of scissors in structure. Generally speaking, the hand tool includes a first component, a second component that crosses with the first component, and a pivoting component that pivots the first and second components. On the lower part of each of the first and second components there is a grip. The pivoting component is connected to the upper parts of the first and second components. The inner surfaces of the first and second components below the pivoting component have a plurality of line-holding troughs. These line-holding troughs are used to peel the insulation layer of the sheathing wire. On the inner side at the top of the first component there is a cutting blade. When the two grips cause the cutting blade to move onto the top of the second component, the hand tool will cut the sheathing wire placed between the first and second components.

However, the conventional hand tool as a whole is like a long grip. The shape makes it inconvenient for its user to carry and makes the user's hands uncomfortable when applying force. Furthermore, the conventional hand tool is not easy to use because the direction towards which the user applies force is not aligned with the direction towards which the insulation layer of the sheathing wire is peeled. In addition, the user must purchase/prepare other tools to handle works other than peeling and cutting sheathing wires. This will increase the user's expenditures in buying tools and load in carrying hand tools with different functions. As a result, a resolution to these problems is desired.

BRIEF SUMMARY

The present invention provides a hand tool that has multiple switchable functions. By turning a switching wheel, the hand tool can be switched between two or more different functions.

According to an embodiment, a hand tool having multiple switchable functions includes a casing, a press cutting mechanism, and a switching wheel. The casing has a hollow chamber in its interior. The press cutting mechanism is installed inside the hollow chamber. The press cutting mechanism includes a ram component and a sleeve that sheathes the ram component. The external periphery of the sleeve has a first positioning surface. The switching wheel has a through hole that corresponds to and selectively connects to the sleeve. The inner wall of the through hole has a second positioning surface. By turning the switching wheel, the second positioning surface and the first positioning surface can be aligned or misaligned.

The embodiment integrates several different functions into a single hand tool. Therefore, a user's overall expenditure for the multiple functions can be reduced. Furthermore, because the external structure of the hand tool is simple, it's more convenient for the user to store and carry the hand tool.

It is to be understood that both the foregoing general description and the following detailed description are exemplary and explanatory only and are not restrictive of the invention, as claimed.

DETAILED DESCRIPTION

Figure 1:
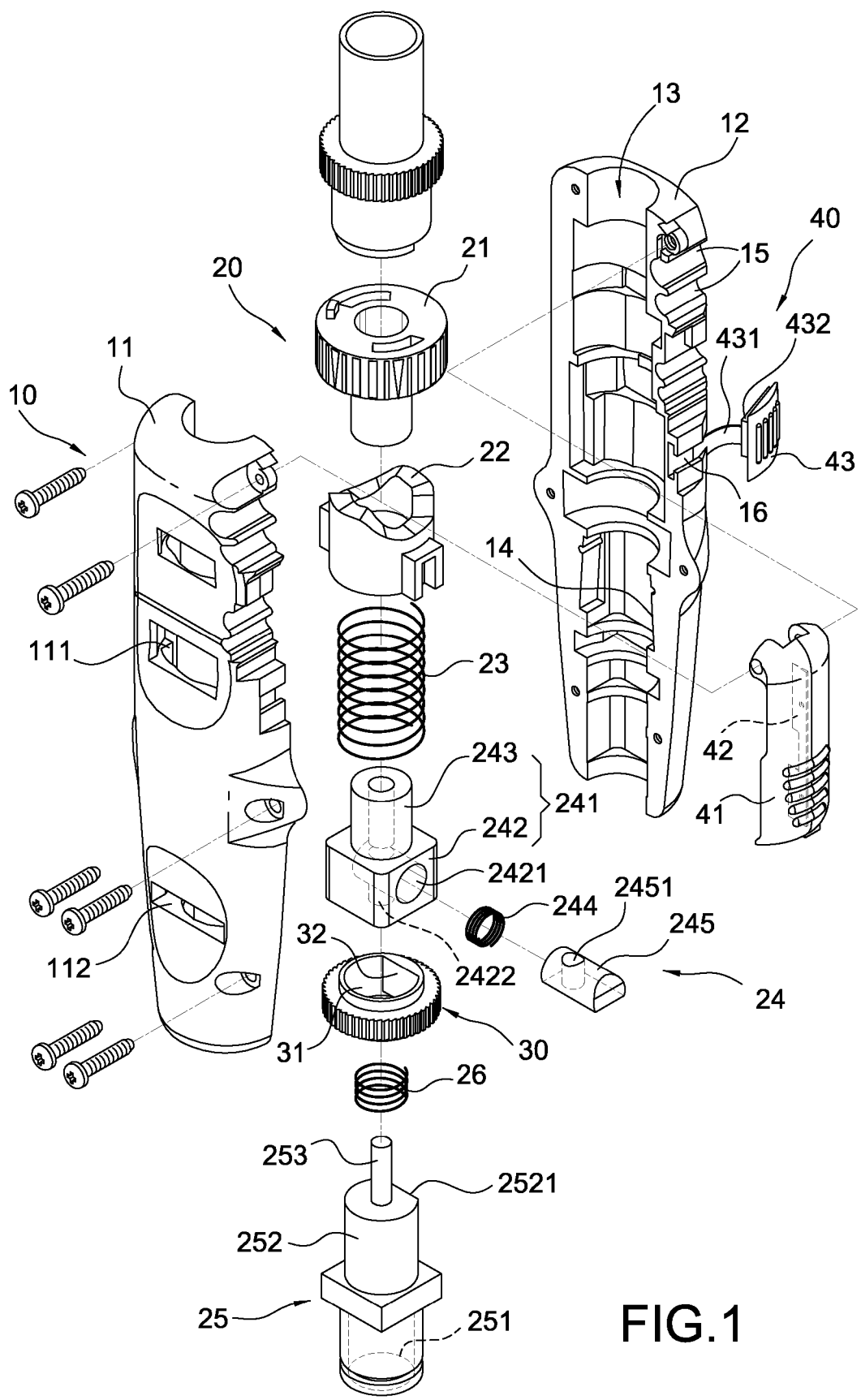
FIG. 1 shows a hand tool in a three dimensional exploded diagram according to an embodiment of the present invention.
Figure 2:
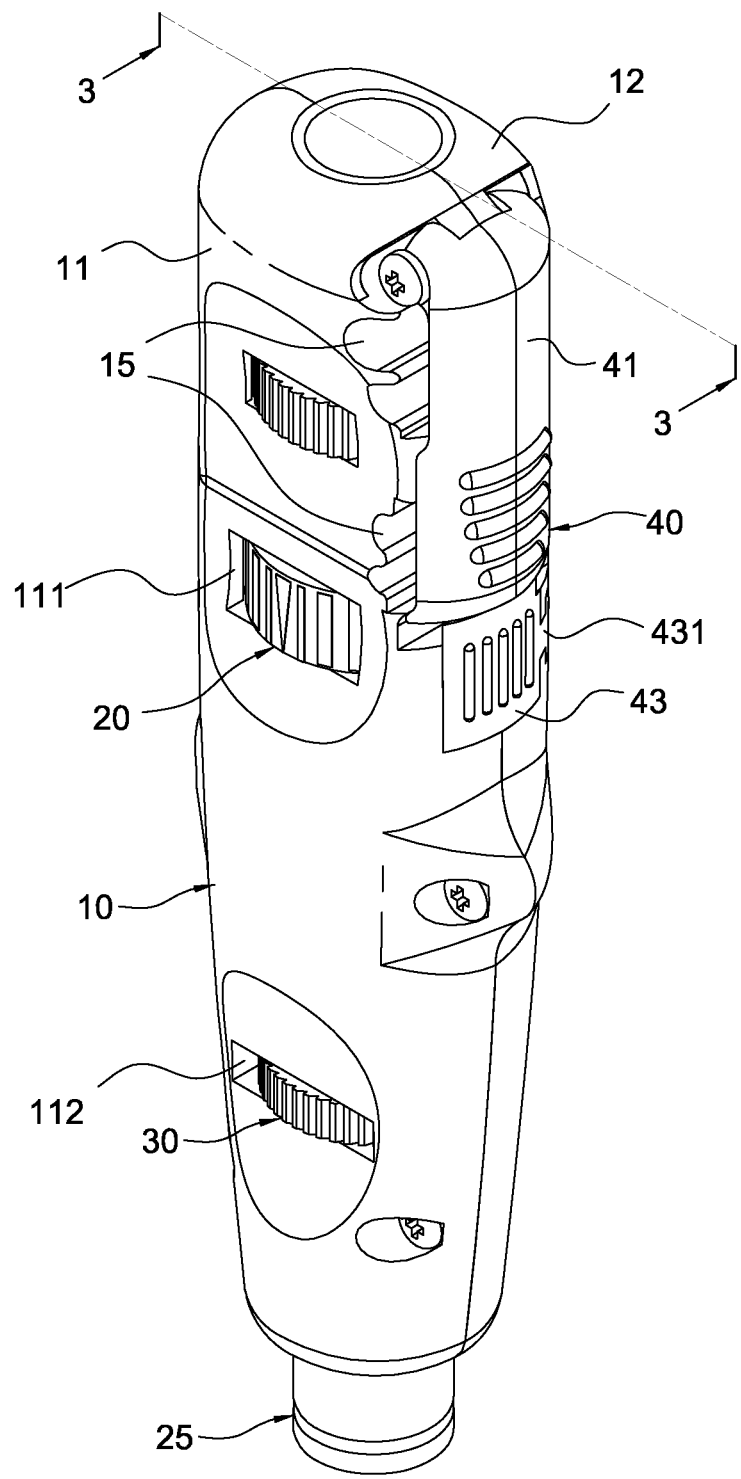
FIG. 2 shows the hand tool in combination in an outside view.
Figure 3:
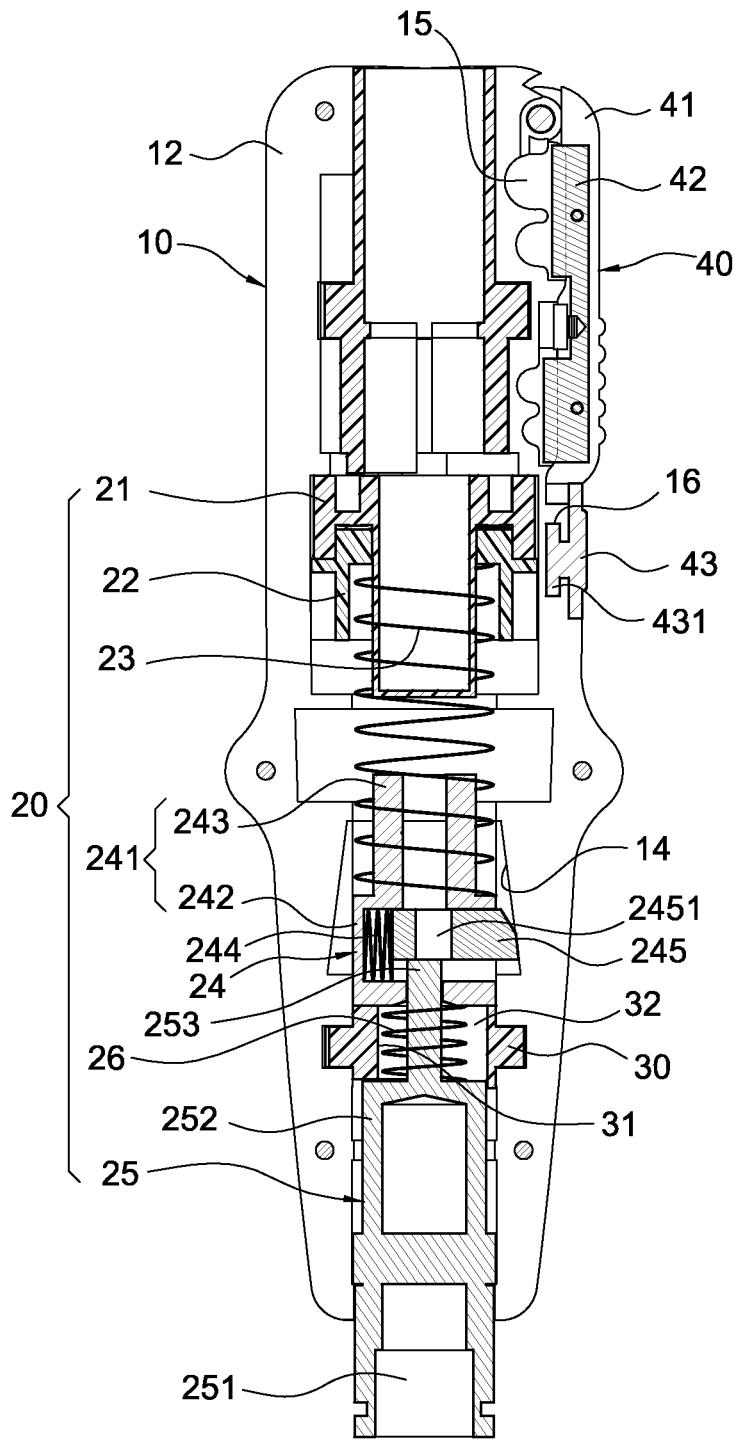
FIG. 3 shows a sectional view along line 3-3 of FIG. 2.

Please refer to FIG. 1 to FIG. 3. Based on an embodiment of the present invention, these figures show a hand tool that can be switched between multiple functions. The hand tool in this embodiment mainly includes a casing 10, a press cutting mechanism 20, and a switching wheel 30.

The casing 10 includes a first casing plate 11 and a second casing plate 12. They are combined by fastening components such as screws. Each of the casing plates 11 and 12 is like half a cylinder. A hollow chamber 13 lies in between the first casing plate 11 and the second casing plate 12. The first casing plate 11 has a first groove 111 and a second groove 112 that serve as two openings of the hollow chamber 13. The hollow chamber 13 is divided into several sub-chambers to contain the press cutting mechanism 20 and the switching wheel 30.

The press cutting mechanism 20 is installed in the hollow chamber 13 and mainly includes a tension knob 21, a cam 22, a first compression spring 23, a ram component 24, a sleeve 25, and a second compression spring 26.

The tension knob 21 lies inside the hollow chamber 13. A part of the tension knob 21 extends to the exterior of the first casing plate 11 through the first groove 111. The cam 22 corresponds to the tension knob 21, encircles a lower part of the tension knob 21, and is limited by the casing plates 11 and 12 to axile movements. The first compression spring 23 is clipped between the ram component 24 and the cam 22 elastically.

The ram component 24 includes a hammer 241, an elastic body 244, and a slide 245. The hammer 241 includes a rectangular block 242 and a protruding axis 243 that extends from a side of the rectangular block 242. The compression spring 23 is positioned through sheathing the protruding axis 243. On a side of the rectangular block 242 there is a blind hole 2421. On the bottom of the rectangular block 242 there is a through hole 2422 that connects the blind hole 2421. The blind hole 2421 sheathes the elastic body 244 and the slide 245 that overlap with each other. On a position inside the hollow chamber 13 of the casing 10 that corresponds to the slide 245 there is a slope 14. The slope 14 actuates the slide 245 to slide into the blind hole 2421. The elastic body 244 is clipped between the rectangular block 242 and the slide 245 elastically. The slide 245 has a through hole 2451.

Figure 4:
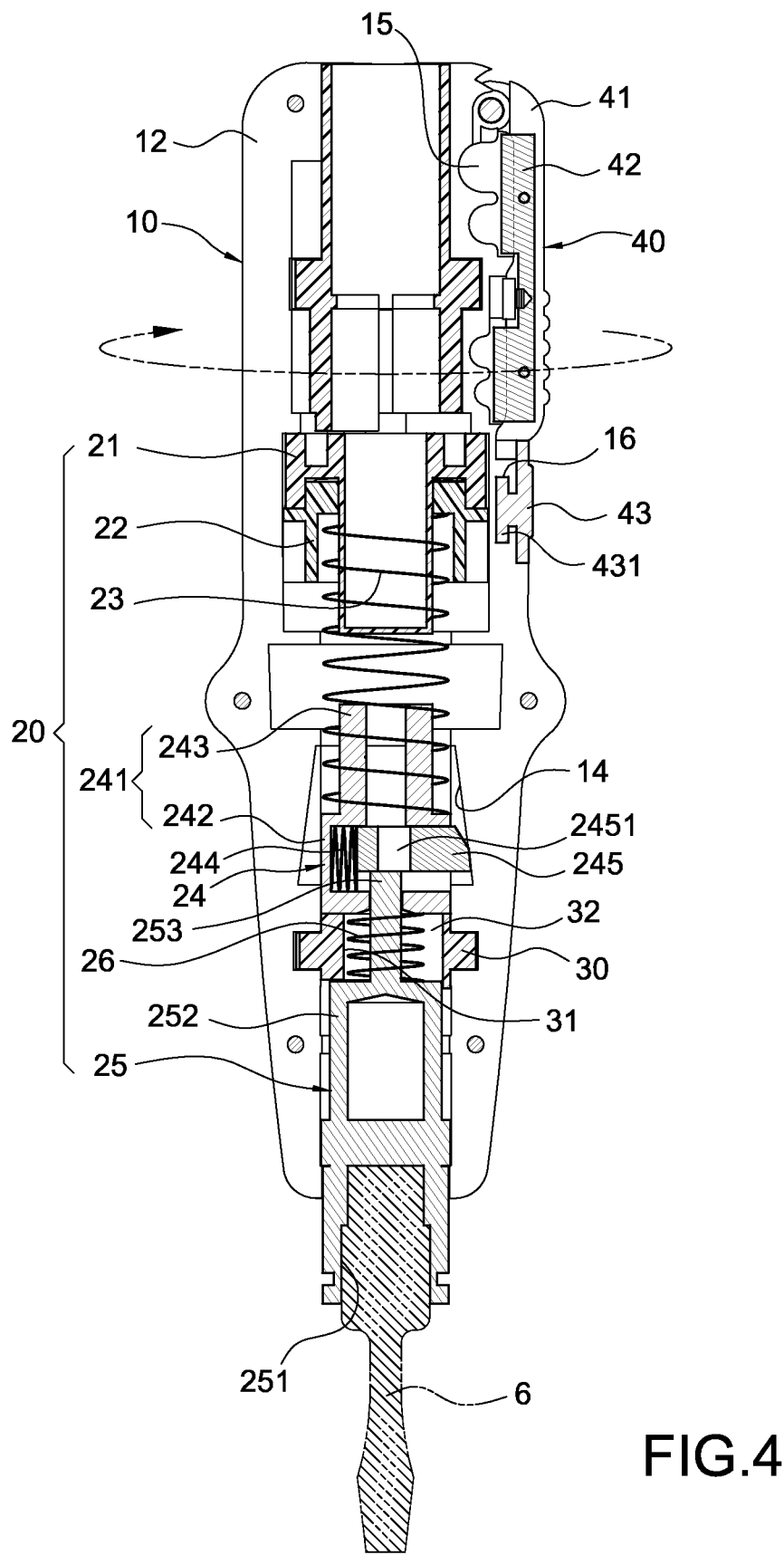
FIG. 4 shows the hand tool being used as a screw driver.

The sleeve 25 is contained within the hollow chamber 13. Being limited by a rectangular block, the sleeve 25 can only have axile movements. The lower part of the sleeve 25 has a plugging hole 251 that allows a screw driver 6, which is shown in FIG. 4, to be plugged therein. The upper part of the sleeve 25 has a first axile rod 252 and a second axile rod 253 that extends upwards from the first axile rod 252. The second axile rod 253 corresponds to and is sheathed by the through hole 2422. The second compression spring 26 encircles the second axile rod 253 and is clipped between the rectangular block 242 and the sleeve 25 elastically. A first positioning surface 2521 lies on the external periphery of the first axile rod 252.

The switching wheel 30 is also contained in the hollow chamber 13. A part of the switching wheel 30 passes through the second groove 112 and reaches the exterior of the first casing plate 11. The switching wheel 30 has a through hole 31. The through hole 31 corresponds to the first axile rod 252 of the sleeve 25 and selectively sheathes the first axile rod 252. On the inner wall of the through hole 31 there is a second positioning surface 32. The switching wheel 30 can be turned so that the second positioning surface 32 can correspond to and contact the first positioning surface 254. The switching wheel 30 can also be turned so that the second positioning surface 32 and the first positioning surface 254 are not aligned and hence will be blocked from contacting each other. This allows the hand tool to be switched between multiple functions.

The hand tool of this embodiment further includes a stripping mechanism 40. The stripping mechanism 40 mainly includes a lift lid 41, a stripping blade 42, a lock 43, and a plurality of line-holding troughs 15 of different sizes. The lift lid 41 is connected to the top of the casing 10 through a pivotal bolt. The stripping blade 42 lies on the inner side of the lift lid 41. The lock 43 is connected to the second casing plate 12 through a soft belt 431. On the position of the casing plates 11 and 12 that corresponds to the soft belt 431 there is an insertion trough 16. The lock 43 has an insertion block 432 that can be plugged into the insertion trough 16. As a result, when the lift lid 41 covers the casing plates 11 and 12, the lock 43 can fix the free end of the lift lid 41. Each of the line-holding troughs 15 corresponds to the position of the lift lid 41 and is formed on the external periphery of the casing plates 11 and 12.

Please refer to FIG. 4, the hand tool of this embodiment allows a tip part 6 of a screw driver to be plugged into the plugging hole 251 of the sleeve 25. In this configuration, the second positioning surface 32 of the switching wheel 30 is not aligned with the first positioning surface 2521 of the first axile rod 252. As a result, the switching wheel 30 does not sheathe the first axile rod 252. When the casing 10 is twisted to rotate the tip part 6 of the screw driver, the hand tool of the embodiment can serve as a screw driver.

Figure 5:
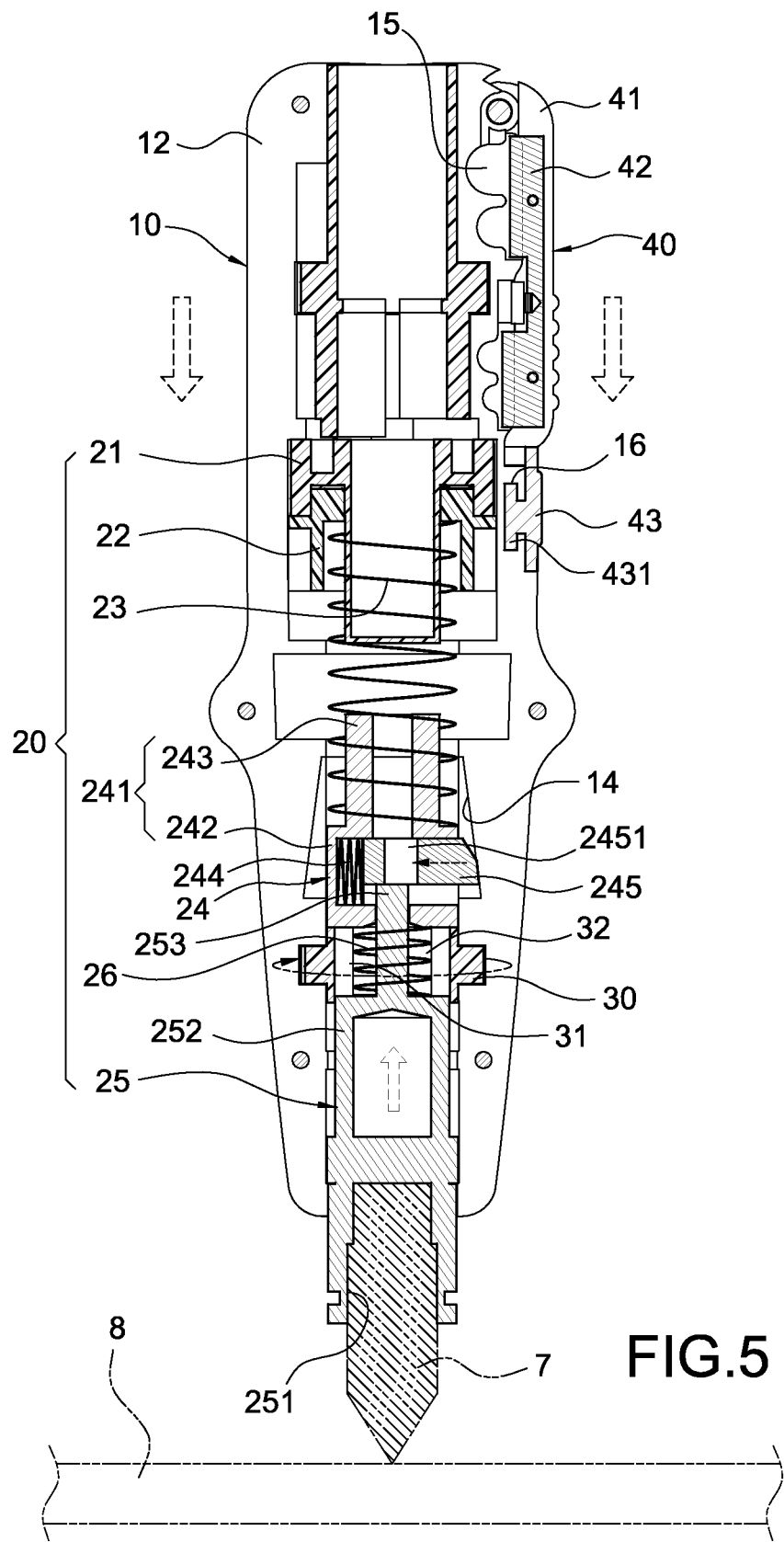
FIGS. 5, 6, and 7 show the hand tool being used as a cutting blade.
Figure 6:
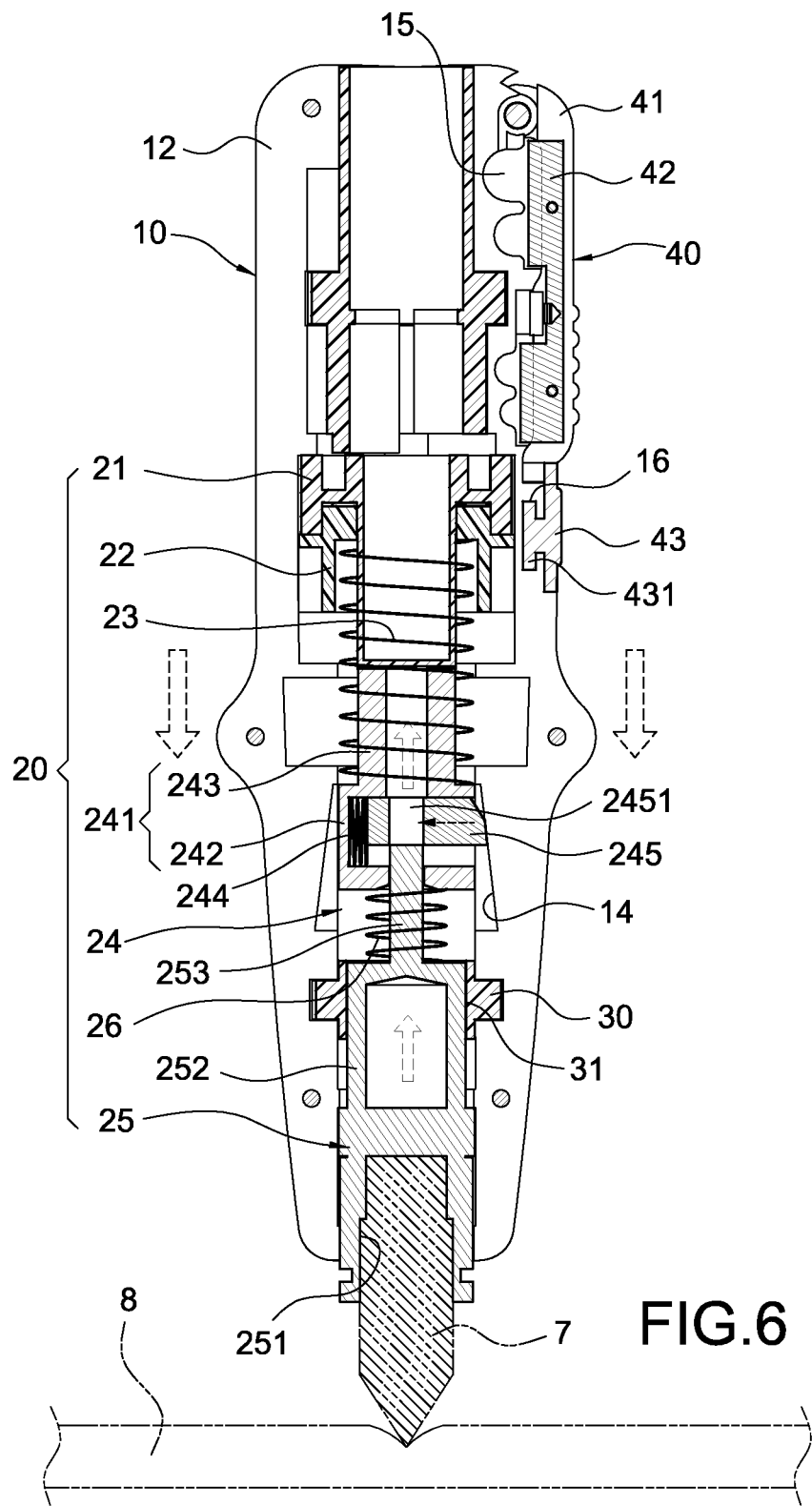
Figure 7:
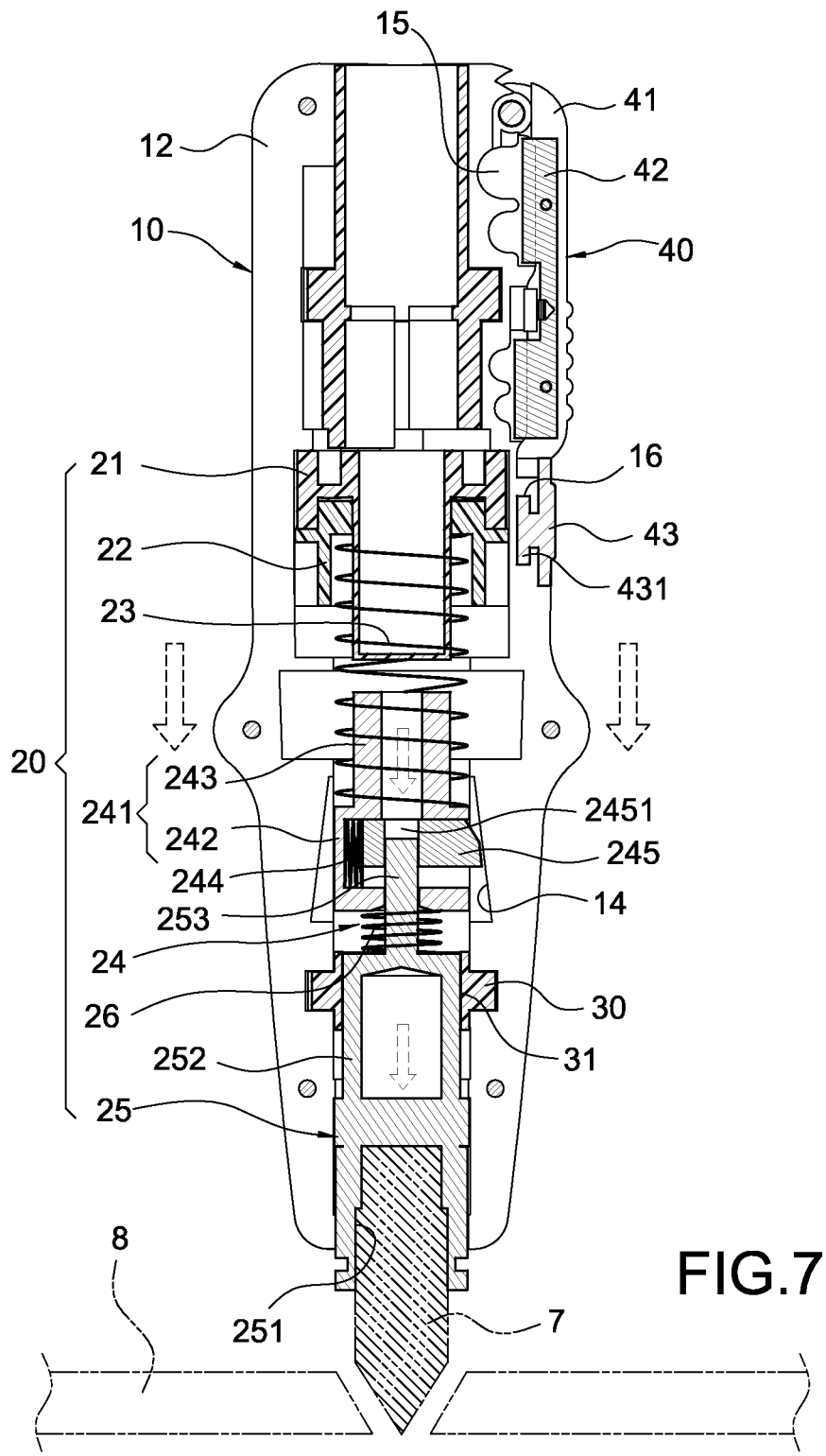

Please refer to FIG. 5 to FIG. 7, the hand tool of the embodiment further allows a cutting blade 7 to be plugged into the plugging hole 251 of the sleeve 25. First, the second positioning surface 32 of the switching wheel 30 is turned to align with the first positioning surface 2521 of the first axile rod 252. Then, a sheathing wire 8 to be cut is placed on a table and the cutting edge of the cutting blade 7 is pressed on the sheathing wire 8. When the casing 10 is pressed downwards, the switching wheel 30 will gradually sheathe the first axile rod 252 of the sleeve 25. The second axile rod 253 will push the slide 245 upward. While the slide 245 is moving upwards, the slope 14 of the casing 10 will press the slide 245 and cause the slide 245 to move to the left of FIG. 5. In the meantime, the up-moving slide 245 will cause the hammer 241 to compress the first compression spring 23. As shown in FIG. 6, the slope 14 will cause the slide 245 to align with the through hole 2451 and the second axile rod 253. Then, the first compression spring 23 will release its spring force, causing the hammer 241 and the slide 245 to move down swiftly. At this moment, the slide 245 sheathes the second axile rod 253 through the through hole 2451, and the hammer 241 compress the second compression spring 26. Then, the second compression spring 26 passes force to the sleeve 25 and cutting blade 7, causing the cutting blade 7 to cut the sheathing wire 8, as shown in FIG. 7.

Figure 8:
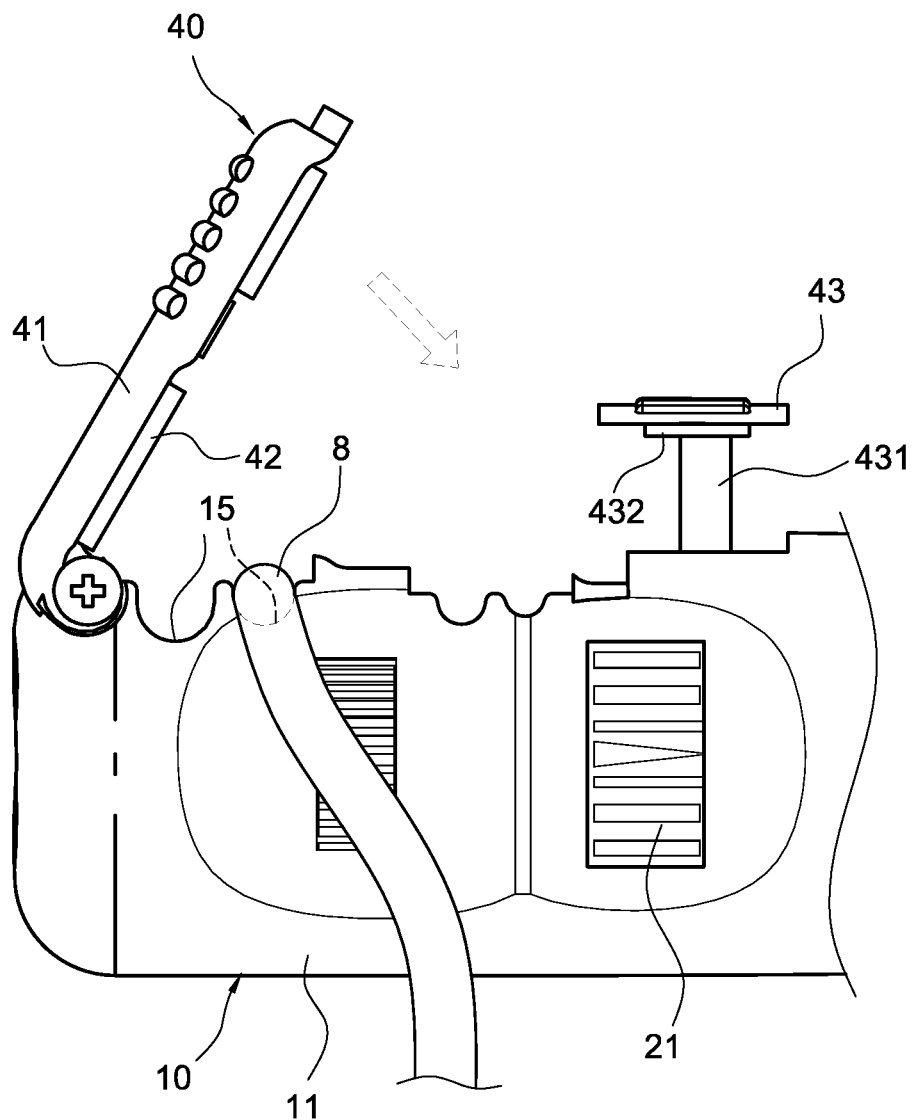
FIGS. 8, 9, and 10 show the hand tool being used to peel a sheathing wire.
Figure 9:
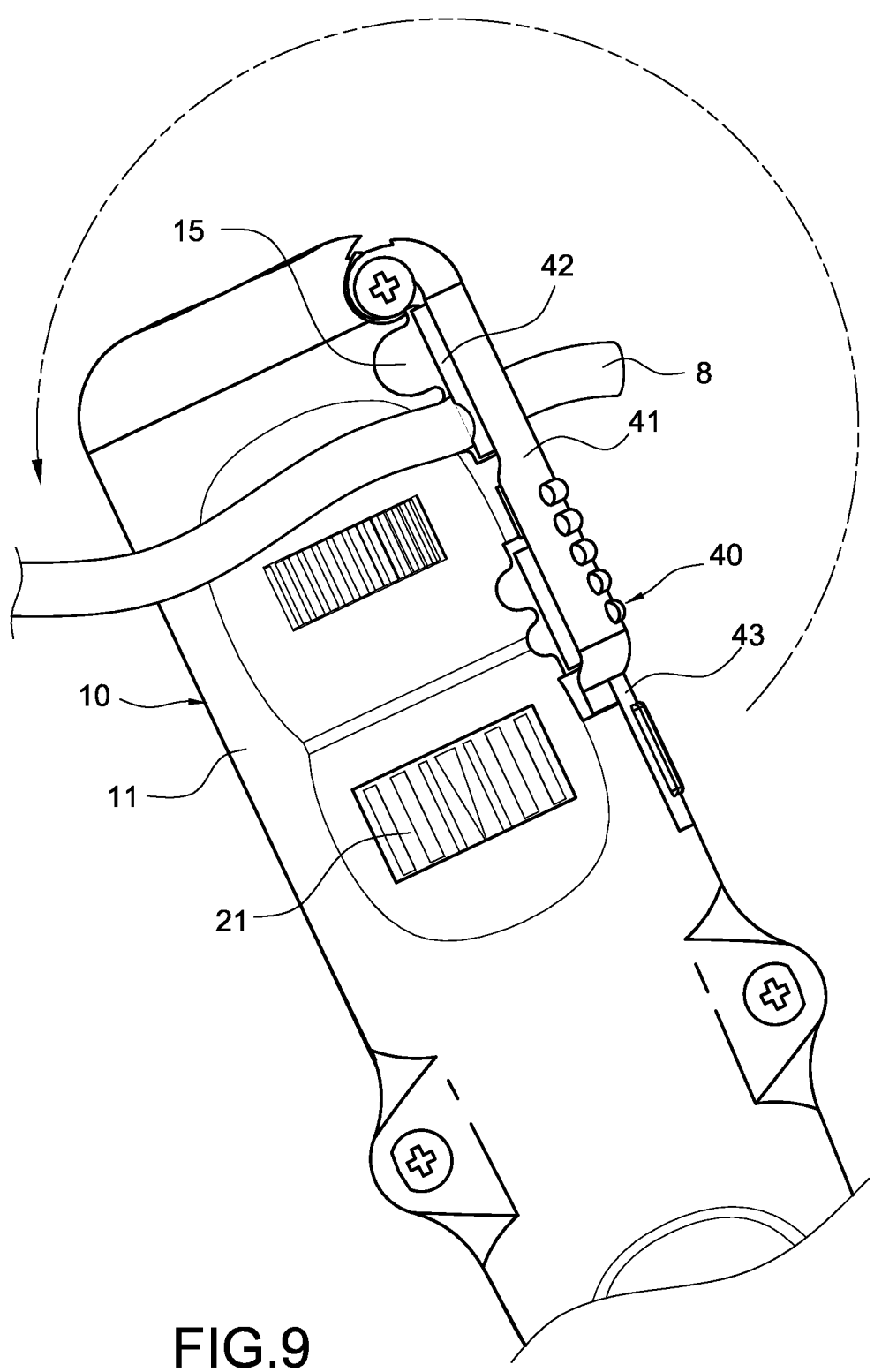
Figure 10:
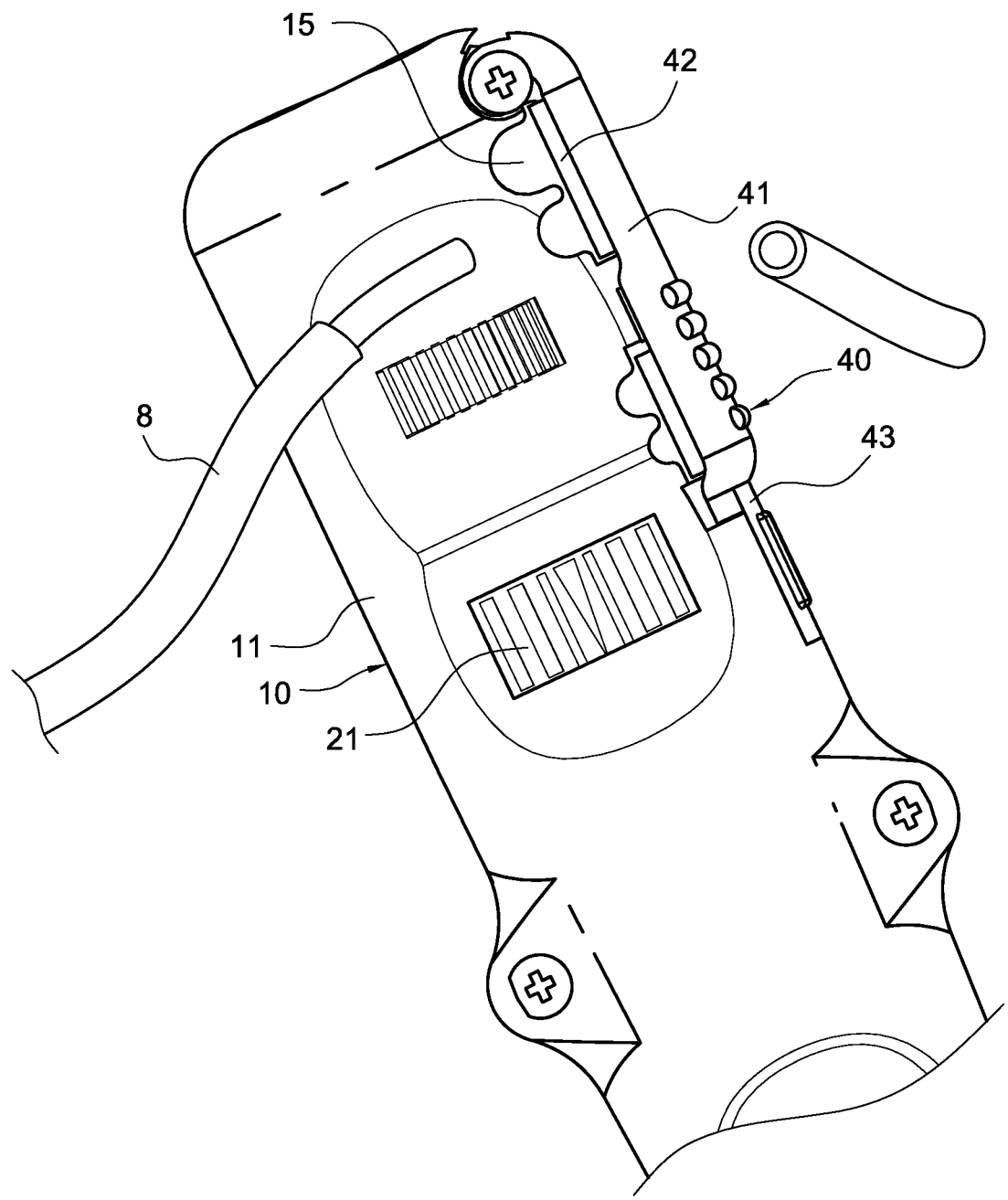

Please refer to FIG. 8 to FIG. 10. The hand tool of this embodiment further can peel the sheathing wire 8. First, the insertion block 432 of the lock 43 should back out from the insertion trough 16 of the casing 10, so that the lift lid 41 is lifted. Then, the sheathing wire 8 is placed in a line-holding trough 15 of appropriate size, as shown in FIG. 8. When the lift lid 41 moves down, the stripping blade 42 will cut into the outer layer of the sheathing wire 8. Then, as shown in FIG. 9, the lock 43 can be fixed to the casing 10, and the casing 10 is rotated while the sheathing wire 8 serves as the center of rotation. Eventually the outer layer of the sheathing wire 8 is peeled as shown in FIG. 10.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A hand tool having multiple switchable functions, comprising:
    a casing, having a hollow chamber in its interior;
    a press cutting mechanism, installed inside the hollow chamber, the press cutting mechanism including a ram component and a sleeve that sheathes a part of the ram component, the sleeve having a first positioning surface in the sleeve's outer periphery;
    a switching wheel, having a through hole that corresponds to and selectively connects the sleeve, the inner wall of the through hole having a second positioning surface, turning the switching wheel causing the second positioning surface to align or misalign with the first positioning surface;
    a stripping mechanism, the stripping mechanism including a lift lid, a stripping blade, and a plurality of line-holding troughs, the lift lid being pivoted to the position of the casing corresponding to the line-holding troughs, the stripping blade being placed on a side of the lift lid that is directly adjacent to the line-holding troughs,
    wherein the stripping mechanism further comprises a lock, the lock is connected to the casing through a soft belt, the casing has an insertion trough, the lock has an insertion block extending outwards for being plugged and positioned in the insertion trough.

2. The hand tool of claim 1, wherein the casing comprises a first casing plate and a second casing plate that correspond to and combine with each other, the hollow chamber is formed in between the first casing plate and the second casing plate.

3. The hand tool of claim 2, wherein the first casing plate has a groove that serves as an opening of the hollow chamber, the switching wheel is contained in the hollow chamber, and a part of the switching wheel passes through the groove and reaches the exterior of the first casing plate.

4. The hand tool of claim 1, wherein the press cutting mechanism further comprises a tension knob, a cam, and a first compression spring, the cam is installed beneath the tension knob, the first compression spring is clipped between the ram component and the cam elastically.

5. The hand tool of claim 4, wherein the press cutting mechanism further comprises a second compression spring, the second compression spring is clipped between the ram component and the sleeve elastically.

6. The hand tool of claim 5, wherein the ram component comprises a hammer, the hammer comprises a rectangular block and a protruding axis that extends from the rectangular block, the protruding axis allows the first compression spring to be sheathed and positioned.

7. The hand tool of claim 6, wherein the ram component further comprises an elastic body and a slide, the rectangular block has a blind hole, the elastic body and the slide overlaps within the blind hole, the elastic body is clipped between the slide and the wall of the blind hole.

8. The hand tool of claim 7, wherein the rectangular block has a through hole that is connected to the blind hole, the sleeve has a first axile rod and a second axile rod extending from the first axile rod, the casing has a slope on the position corresponding to the slide, the slide is for recessing into the blind hole when being pressed by the slope, so that the second axile rod correspondingly and selectively sheathes the through hole.

9. The hand tool of claim 8, wherein the first positioning surface is formed on the first axile rod.

* * * * *